US006356289B1

(12) United States Patent
Tomita et al.

(10) Patent No.: US 6,356,289 B1
(45) Date of Patent: Mar. 12, 2002

(54) METHOD AND SYSTEM FOR FORMING AN IMAGE BASED UPON VARIABLE ADHESION FORCE OF DEVELOPER AND IMAGE FORMING SURFACE

(75) Inventors: Satoru Tomita; Hiroshi Kondo, both of Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/537,643

(22) Filed: Mar. 29, 2000

(30) Foreign Application Priority Data

Apr. 16, 1999 (JP) .......................................... 11-109188

(51) Int. Cl.[7] ............................................... G01D 15/10

(52) U.S. Cl. ....................... 347/114; 347/171; 430/109; 430/126

(58) Field of Search ................................ 347/171, 114; 399/297, 307, 252, 159, 130; 430/126, 348, 353, 109, 110; 250/317.1, 318

(56) References Cited

U.S. PATENT DOCUMENTS 4,080,897 A * 3/1978 Gundlach ................... 430/200
4,140,907 A * 2/1979 Oba ........................... 250/316
4,315,643 A * 2/1982 Tokunaga et al.
4,462,035 A * 7/1984 Koto .......................... 347/199
4,470,055 A * 9/1984 Todoh ..................... 346/140.1
5,400,065 A * 3/1995 Tomono et al. ............. 347/172
5,614,935 A * 3/1997 Ogi et al. .................... 347/213
5,666,598 A * 9/1997 Sugita et al. ............... 399/136

FOREIGN PATENT DOCUMENTS

| | | |
|---|---|---|
| JP | 05-330103 | * 12/1993 |
| JP | 06-246939 | * 9/1994 |
| JP | 09-024634 | * 1/1997 |
| JP | 10 798 | 1/1998 |
| JP | 10 76689 | 3/1998 |
| JP | 10 81028 | 3/1998 |
| JP | 10 157175 | 6/1998 |

* cited by examiner

*Primary Examiner*—Robert Beatty
(74) *Attorney, Agent, or Firm*—Knoble & Yoshida, LLC

(57) ABSTRACT

Toner is placed on to the image-forming surface and then is transferred onto the image-carrying medium based upon adhesion force. A sharp image is formed without suffering from the dispersion of toner during the transfer process. In addition, the adhesion force-based image forming device is simpler in construction and advantageously produces substantially no ozone. One preferred embodiment transfers heat sensitive toner to an image-carrying medium by increasing the adhesion force of the toner and almost simultaneously decreasing the adhesion force of the image-forming surface with the raised temperature.

16 Claims, 4 Drawing Sheets

METHOD AND SYSTEM FOR FORMING AN IMAGE BASED UPON VARIABLE ADHESION FORCE OF DEVELOPER AND IMAGE FORMING SURFACE

FIELD OF THE INVENTION

The current invention is generally related to image formation or reproduction, and more particularly related to the image formation on an image-carrying medium using an image-forming material whose adhesion force is sensitive to a predetermined stimulus.

BACKGROUND OF THE INVENTION

Japanese Patent Publications Hei 10-798, 10-76689, 10-81028 and 10-157175 all have disclosed thermal image-forming devices. In stead of a photoreceptor used in an electrostatic process, the thermal image-forming devices in general include an image-forming surface whose adhesion force changes based upon temperature, a heating unit for selectively heating the image-forming surface, a application unit for applying colorant to the image-forming surface and a transferring unit for transferring the colorant from the image-forming surface. The above described thermal image forming device do not perform complex image formation processes as required in electrostatic devices and also advantageously do not produce harmful material such as image ozone.

According to the above Japanese Patent Publications, the prior art thermal devices are not able to produce a sharp image. The image formation by colorant on an image-forming surface is relative stable since the colorant is placed on the image-forming surface due to adhesion force. However, when the colorant is transferred from the image-forming surface to an image-carrying medium, since the voltage or electrostatic transfer method is used, the conventional problem of the colorant dispersion is not solved. The prior art thermal image formation devices fail to output a high-resolution image.

To solve the above described problem, it is desired to substantially minimize the dispersion of colorant when the colorant or developer is transferred from the image-forming surface onto an image-carrying medium. It is also desired to eliminate the generation of ozone during the image formation process while the image is formed in a high resolution.

SUMMARY OF THE INVENTION

In order to solve the above and other problems, according to a first aspect of the current invention, a method of controlling relative adhesion force of predetermined developer and an image-forming surface with respect to a predetermined image-carrying medium, includes the acts of adjusting a first adhesion force level of the predetermined developer; adjusting a second adhesion force level of the image-forming surface; placing the predetermined developer on the image-forming surface according to a desired image when the second adhesion force level is higher than the first adhesion force level; and transferring the predetermined developer on the image-forming surface onto the image-carrying medium when the first adhesion force level is higher than the second adhesion force level.

According to a second aspect of the current invention, a method of controlling relative adhesion force of predetermined developer and an image-forming surface with respect to a predetermined image-carrying medium, including acts of adjusting a first adhesion force level of the predetermined developer; adjusting a second adhesion force level of the image-forming surface; placing the predetermined developer on the image-forming surface according to a desired image when the first adhesion force level and the second adhesion force level are both higher; and transferring the predetermined developer on the image-forming surface onto the image-carrying medium when the first adhesion force level is substantially higher than the second adhesion force level.

According to a third aspect of the current invention, a system for controlling relative adhesion force of predetermined developer and an image-forming surface with respect to a predetermined image-carrying medium, including a developer holding unit for holding the predetermined developer; a first adhesion force adjustment unit located near the developer holding unit for adjusting a first adhesion force level of the predetermined developer; a image-forming unit located near the developer holding unit having an image-forming surface and for selectively placing the toner on the image-forming surface; a second adhesion force adjustment unit located near the image-forming unit for adjusting a second adhesion force level of the image-forming surface; and whereby the predetermined developer is placed on the image-forming surface according to a desired image when the second adhesion force level is higher than the first adhesion force level, the predetermined developer on the image-forming surface is transferred onto the image-carrying medium when the first adhesion force level is higher than the second adhesion force level.

According to a fourth aspect of the current invention, a system for controlling relative adhesion force of predetermined developer and an image-forming surface with respect to a predetermined image-carrying medium, including: a developer holding unit for holding the predetermined developer; a first adhesion force adjustment unit located near the developer holding unit for adjusting a first adhesion force level of the predetermined developer; a image-forming unit located near the developer holding unit having an image-forming surface and for selectively placing the toner on the image-forming surface; a second adhesion force adjustment unit located near the image-forming unit for adjusting a second adhesion force level of the image-forming surface; and whereby the predetermined developer is placed on the image-forming surface according to a desired image when the first adhesion force level and the second adhesion force level are both higher, the predetermined developer on the image-forming surface is transferred onto the image-carrying medium when the first adhesion force level is higher than the second adhesion force level.

These and various other advantages and features of novelty which characterize the invention are pointed out with particularity in the claims annexed hereto and forming a part hereof However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
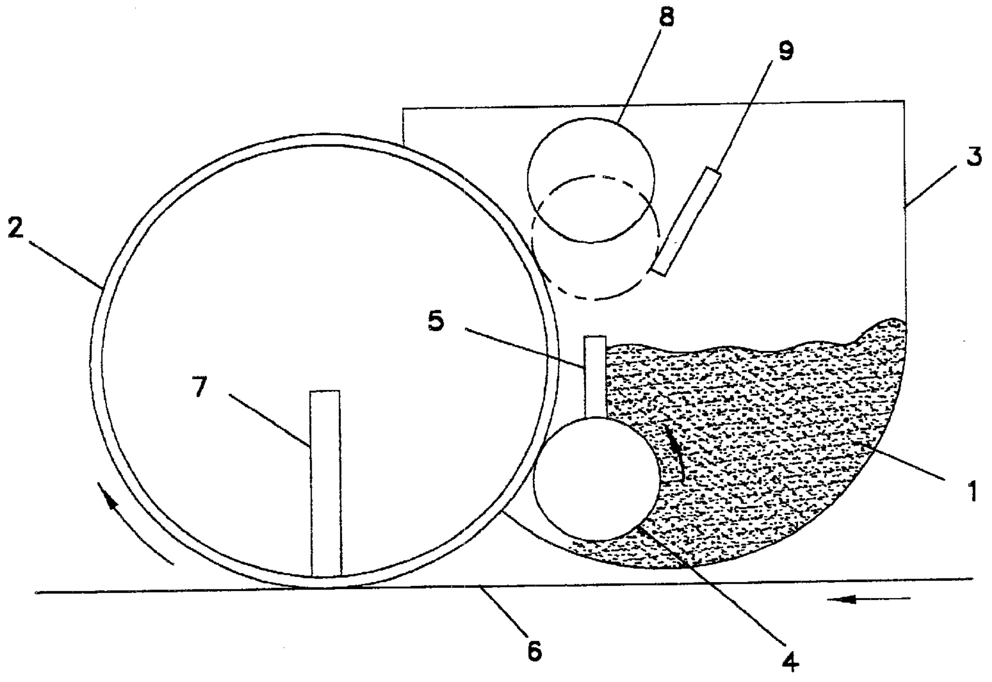
FIG. 1 is a diagram illustrating in a cross sectional view a first preferred embodiment of the thermal image-formation device according to the current invention.

Referring now to the drawings, wherein like reference numerals designate corresponding structures throughout the views, and referring in particular to FIG. 1, a diagram illustrates in a cross sectional view a first preferred embodiment of the thermal image-formation device according to the current invention. A toner holding unit 3 contains toner 1. In general, to apply the toner 1 onto a image forming surface 2 (also called "toner holding surface"), a toner application roller 4 first applies a uniform layer of the toner 1 on its surface which rotates in a counter clockwise direction as indicated by an arrow. A doctor blade 5 regulates an amount of the uniform toner layer on the surface of the toner application roller 4. The uniform layer of the toner 1 on the toner application roller 4 is uniformly transferred onto an image-forming roller or image forming surface 2 through an opening on the toner holding unit 3 to form a desired image. The image-forming surface 2 rotates in a clockwise direction as indicated by another arrow. The toner on the image-forming surface 2 is selectively transferred onto an image-carrying medium 6 such as paper. After the toner on the image-forming surface 2 is transferred onto the image-carrying medium 6, a movable cleaning roller 8 removes residual toner from the image-forming surface 2 with a help of a cleaning blade 9. The cleaning roller 8 is moved into a position as indicated in dotted lines to contact the image-forming surface 2 on a predetermined periodic basis or a predetermined event. For example, the predetermined events include a predetermined number of copies and a power on or off event.

Still referring to FIG. 1, the first preferred embodiment according to the current invention further includes thermal units. The image-forming surface 2 is coated with a thermally sensitive material that changes its adhesion force or viscosity. To control the adhesion force on the image-forming surface 2, a thermal control unit 7 such as a thermal head or a laser source is located inside the image-forming roller 2 to generate heat to be selectively transmitted onto the image-forming surface 2 as the image-forming roller 2 rotates. In the first preferred embodiment, the adhesion force on the image-forming surface 2 rapidly decreases beyond a predetermined temperature. Using the change in adhesion force on the image-forming surface 2, a uniform layer of toner 1 is selectively transferred onto the image-carrying medium 6 to form a desired image.

Figure 2:
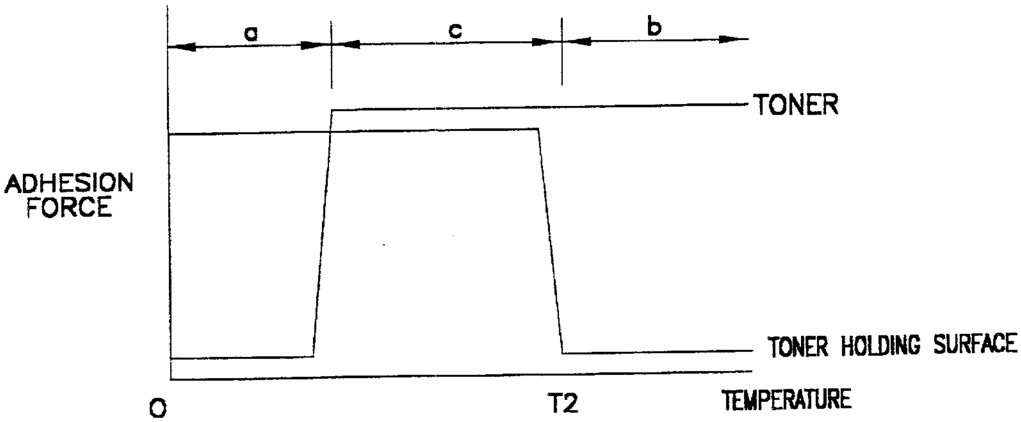
FIG. 2 is a graph illustrating as to how the first preferred embodiment according to the current invention operates on the thermally sensitive adhesion force of the toner and the image-forming surface.

Now referring to FIG. 2, a graph illustrates as to how the first preferred embodiment according to the current invention operates on the thermally sensitive adhesion force or viscosity of the toner and the image-forming surface. Within a first temperature range a below a first predetermined temperature T1, a certain predetermined toner 1 has a relatively low adhesion force while the image-forming surface 2 has a relatively high adhesion force. Within the first temperature range a, the toner 1 on the toner application roller 4 is uniformly transferred onto the image-forming surface 2. The uniformly applied toner on the image-forming surface 2 is moved towards the thermal unit 7 in a clockwise direction. The thermal unit 7 generates heat and transmits it to a limited area of the image-forming surface 2 according to a desired image to be generated on the image-carrying medium 6. The heat generation brings the temperature on the limited area of the image-forming surface 2 within a predetermined second temperature range c beyond the first predetermined temperature T1 but below a second temperature T2. Near the first predetermined temperature T1, the adhesion force of the toner substantially increases, and the increased toner adhesion force remains substantially high within the second temperature range c. Within the second temperature range c, the adhesion force of the image-forming surface 2 also remains substantially high. The heat generation further brings the temperature on the limited area of the image-forming surface 2 within a predetermined third temperature range b beyond the second predetermined temperature T2. Near the second predetermined temperature T2, the adhesion force of the image-forming surface 2 substantially decreases, and the decreased image-forming surface adhesion force remains substantially low within the third temperature range b. The second temperature T2 is higher than the first temperature T1. Within the third temperature range b, the adhesion force of the toner remains substantially high while that of the image-forming surface remains substantially low. Because of the difference in adhesion force of the toner on the image-forming surface and the image-forming surface within in the third temperature range b, the toner is released from the image-forming surface and is stuck onto the image-carrying medium.

Still referring to FIG. 2, in contrast to the third temperature range b where the toner transfer occurs, in other two temperature ranges a and c, the toner is not transferred onto the image-carrying medium. Within the first temperature range a, since the toner has a low adhesion force level and the image-forming surface 2 has a high adhesion force level, the toner does not leave the image-forming surface 2 even if the toner is in contact with the image-carrying medium 6. Similarly, within the second temperature range c, since the toner and the image-forming surface 2 both have a high adhesion force level, the toner and the image-forming surface 2 are attracted with each other and the toner does not leave the image-forming surface 2 even if the toner is in contact with the image-carrying medium 6. After the toner on a given portion of the image-forming surface near the thermal unit 7 is selectively transferred onto the image-carrying medium 6, the given image-forming surface portion 2 rotates away from the thermal control unit 7. As the image-forming portion 2 rotates back towards the toner application roller 4, the temperature of the image-forming portion 2 decreases from the third temperature range b to the second temperature range c and then to the first temperature range a. As the image-forming portion 2 reaches the toner application roller 4, the image-forming portion 2 is within the first temperature range a to accept a new uniform layer of toner. Preferably, the temperature difference to create a rapid adhesion force change is within 10° C. and more preferably within 5° C. In summary, within the first and second temperature ranges a and c, no image is formed on the image-carrying medium while within the third temperature range b, an image is formed on the image-carrying medium.

In alternative embodiment of the thermal image-forming device according to the current invention, the second temperature range b is used to uniformly apply the toner from the application roller 4 onto the image-forming surface 2. The adhesion force of the application roller 4 is designed to be lower than that of the image-forming surface 2 within the second temperature range c. The alternative embodiment is suitable for an image-forming surface which is slow in cooling and thus allows a faster image-duplication process as the overall temperature range is smaller than the first preferred embodiment.

Figure 3:
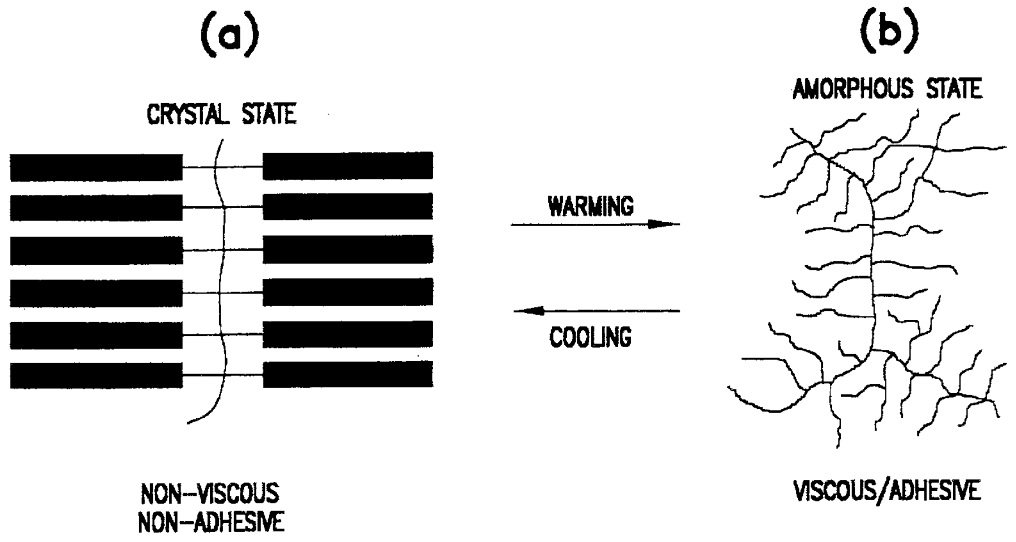
FIG. 3 is a diagram illustrating that the cool off type adhesive in the crystalline state as well as in the amorphous state.
Figure 4:
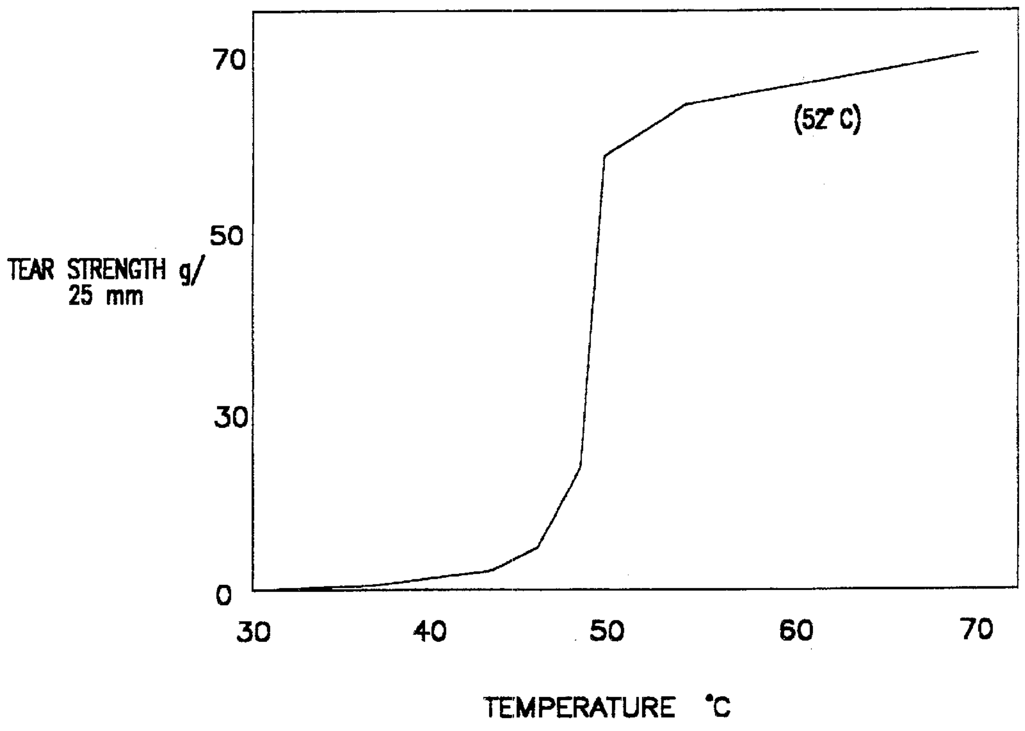
FIG. 4 shows that the adhesion force of a certain cool off type adhesive dramatically changes around a predetermined temperature of 52° C.

To implement the above-described preferred embodiment, certain commercially available materials are used. For example, the adhesive used on Interimer™ adhesive tape from Nitta Kabushiki Kaisha is a cool off type whose adhesion force increases beyond a predetermined temperature while it decreases below a predetermined temperature. On the other hand, a warm down type adhesive increases its adhesion force below a predetermined temperature while it decreases its adhesion force above the predetermined temperature. That is, the cool off type adhesive is in a crystalline state when it has a low adhesion force level. The cool off type adhesive is in an amorphous state when it has a high adhesion force level. Now referring to FIG. 3, a diagram illustrates that when the cool off type adhesive in the crystalline state, the molecules are in arranged in an orderly fashion. In contrast, when the cool off type is warmed beyond the predetermined temperature, the molecules are arranged in an amorphous state and the adhesion force increases. These two states are repeatedly interchanged by crossing the predetermined temperature. FIG. 4 shows that the adhesion force of a certain cool off type adhesive dramatically changes around a predetermined temperature of 52° C. Beyond the predetermined temperature, the adhesion force of the cool off type adhesive climbs beyond 60 g/25 mm while below the predetermined temperature, the adhesion force rapidly decreases towards 0 g/25 mm.

Figure 5:
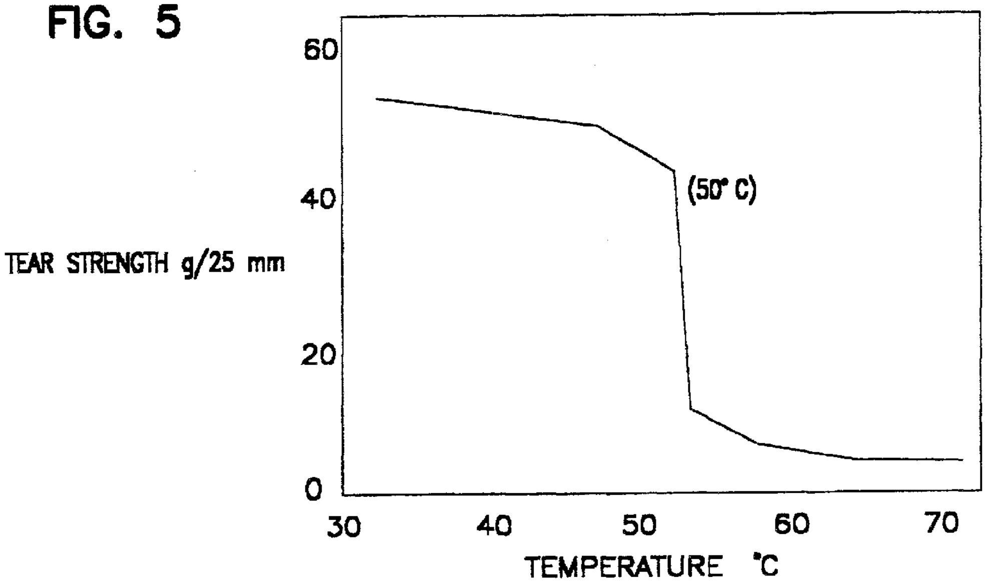
FIG. 5 is a graph to for illustrating the characteristics of a warm down type adhesive material that rapidly decreases its adhesion force as the temperature rises beyond a predetermined temperature.
Figure 6:
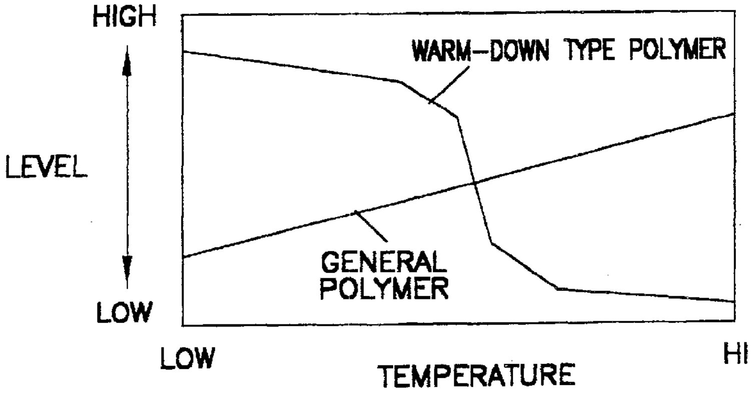
FIG. 6 shows a comparison in adhesion force between the above-described warm down type polymer and general polymer.

Now referring to FIG. 5, a warm down type adhesive material rapidly decreases its adhesion force as the temperature rises beyond a predetermined temperature. The warm down type adhesive material does not undergo the crystalline-amorphous state change. The warm down type adhesive material includes a mixture of certain high adhesion force material and certain low adhesion force material. As the temperature is raised, the low adhesion force material surfaces and the mixture adhesive turns into separate layers. As a result, the adhesive as a whole loses adhesion force. Thus, the warm down type adhesive material undergoes the mixture-separation state change. The diagram shows that the adhesion force of a certain warm down type adhesive dramatically changes around a predetermined temperature of 50° C. Beyond the predetermined temperature, the adhesion force of the warm down type adhesive drops down towards 5 g/25 mm while below the predetermined temperature, the adhesion force rapidly increases towards 50 g/25 mm. FIG. 6 shows a comparison in adhesion force between the above-described warm down type polymer and general polymer. Within one to two degrees around 50° C., the adhesion force of the warm down type polymer rapidly changes. On the other hand, the general polymer fails to show the above rapid adhesion force change at a certain predetermined degree.

Figure 7:
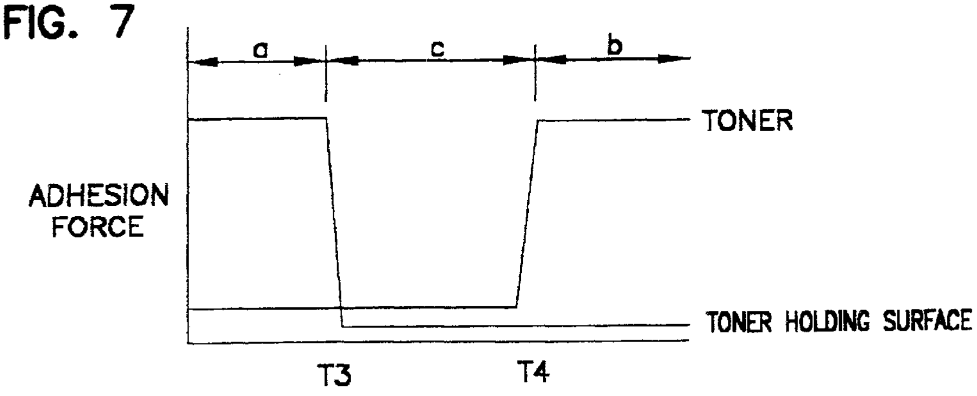
FIG. 7 is a graph illustrating as to how a second preferred embodiment according to the current invention operates on the thermally sensitive adhesion force of the toner and the image-forming surface.

Now referring to FIG. 7, a graph illustrates as to how a second preferred embodiment according to the current invention operates on the thermally sensitive adhesion force of the toner and the image-forming surface. The second preferred embodiment includes components or units which are substantially identical to those of the first preferred embodiment as illustrated in FIG. 1. The descriptions of these components are incorporated herein. Within a first temperature range a below a first predetermined temperature T3, a certain predetermined toner 1 has a relatively low adhesion force while the image-forming surface 2 has a relatively high adhesion force. Within the first temperature range a, the toner 1 on the toner application roller 4 is uniformly transferred onto the image-forming surface 2. The uniformly applied toner on the image-forming surface 2 is moved towards the thermal unit 7 in a clockwise direction. The thermal unit 7 generates heat and transmits it to a limited area of the image-forming surface 2 according to a desired image to be generated on the image-carrying medium 6. The heat generation brings the temperature on the limited area of the image-forming surface 2 within a predetermined second temperature range c beyond the first predetermined temperature T3 but below a second temperature T4. Near the first predetermined temperature T3, the adhesion force of the image-forming surface 2 substantially decreases, and the decreased image-forming surface adhesion force remains substantially low within the second temperature range c. Within the second temperature range c, the toner adhesion force also remains substantially low. Within the second temperature range c, although the adhesion force of both the toner 1 and the image-forming surface 2 is relative low, the toner 1 remains on the image-forming surface 2 since the adhesion force is controlled to remain above zero in the second temperature range c. With the low adhesion force, the electrostatic force also helps the toner remain on the image-forming surface 2. The heat generation further brings the temperature on the limited area of the image-forming surface 2 within a predetermined third temperature range b beyond the second predetermined temperature T4. Near the second predetermined temperature T4, the toner adhesion force substantially increases, and the increased toner adhesion force remains substantially high within the third temperature range b. The second temperature T4 is higher than the first temperature T3. Within the third temperature range b, the adhesion force of the toner remains substantially high while that of the image-forming surface remains substantially low. Because of the difference in adhesion force of the toner on the image-forming surface and the image-forming surface within in the third temperature range b, the toner is released from the image-forming surface and is stuck onto the image-carrying medium.

Still referring to FIG. 7, in contrast to the third temperature range b where the toner transfer occurs, in other two temperature ranges a and c, the toner is not transferred onto the image-carrying medium. Within the first temperature range a, since the toner has a low adhesion force level and the image-forming surface 2 has a high adhesion force level, the toner does not leave the image-forming surface 2 even if the toner is in contact with the image-carrying medium 6, within the second temperature range c, since the toner and the image-forming surface 2 both have a low adhesion force level, the toner does not leave the image-forming surface 2 even if the toner is in contact with the image-carrying medium 6. After the toner on a given portion of the image-forming surface 2 near the thermal unit 7 is selectively transferred onto the image-carrying medium 6, the given image-forming surface portion 2 rotates away from the thermal control unit 7. As the image-forming portion 2 rotates back towards the toner application roller 4, the temperature of the image-forming portion 2 decreases from the third temperature range b to the second temperature range c and then to the first temperature range a. As the image-forming portion 2 reaches the toner application roller 4, the image-forming portion 2 is within the first temperature range a to accept a new uniform layer of toner. Preferably, the temperature difference to create a rapid adhesion force change is within 10° C. and more preferably within 5° C. In summary, within the first and second temperature ranges a and c, no image is formed on the image-carrying medium while within the third temperature range b, an image is formed on the image-carrying medium.

Figure 8:
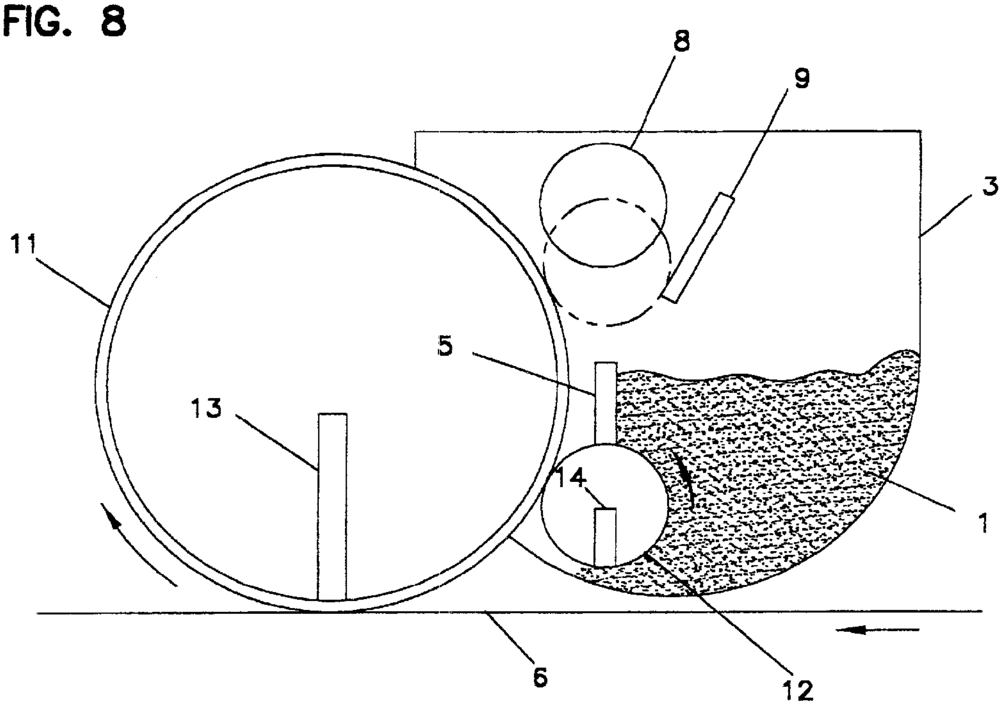
FIG. 8 is a diagram illustrating in a cross sectional view a third preferred embodiment of the thermal image-formation device according to the current invention.

FIG. 8 is a diagram illustrating in a cross sectional view a third preferred embodiment of the thermal image-formation device according to the current invention. A toner holding unit 3 contains toner 1. In general, to apply the toner 1 onto a toner holding unit 2, a toner application roller 12 first applies a uniform layer of the toner 1 on its surface which rotates in a counter clockwise direction as indicated by an arrow. A doctor blade 5 regulates an amount of the uniform toner layer on the surface of the toner application roller 12. A heat source 14 regulates the temperature of the toner 1 on the surface of the toner application roller 12. The uniform layer of the toner 1 on the toner application roller 12 is uniformly transferred onto an image-forming roller or toner holding surface 11 through an opening on the toner holding unit 3 to form a desired image. The image-forming surface 11 rotates in a clockwise direction as indicated by another arrow. The toner on the image-forming surface 11 is selectively transferred onto an image-carrying medium 6 such as paper. After the toner on the image-forming surface 11 is transferred onto the image-carrying medium 6, a movable cleaning roller 8 removes residual toner from the image-forming surface 11 with a help of a cleaning blade 9. The cleaning roller 8 is moved into a position as indicated in dotted lines to contact the image-forming surface 11 on a predetermined periodic basis or a predetermined event. For example, the predetermined events include a predetermined number of copies and a power on or off event.

Still referring to FIG. 8, the third preferred embodiment according to the current invention further includes thermal units. The image-forming surface 11 is coated with a thermally sensitive material that changes its adhesion force. To control the adhesion force on the image-forming surface 1, a thermal control unit 13 such as a thermal head or a laser source is located inside the image-forming roller 11 to generate heat to be selectively transmitted onto the image-forming surface 11 as the image-forming roller 11 rotates. In the first preferred embodiment, the adhesion force on the image-forming surface 11 rapidly decreases beyond a predetermined temperature. Using the change in adhesion force on the image-forming surface 11, a uniform layer of toner 1 is selectively transferred onto the image-carrying medium 6 to form a desired image.

Figure 9:
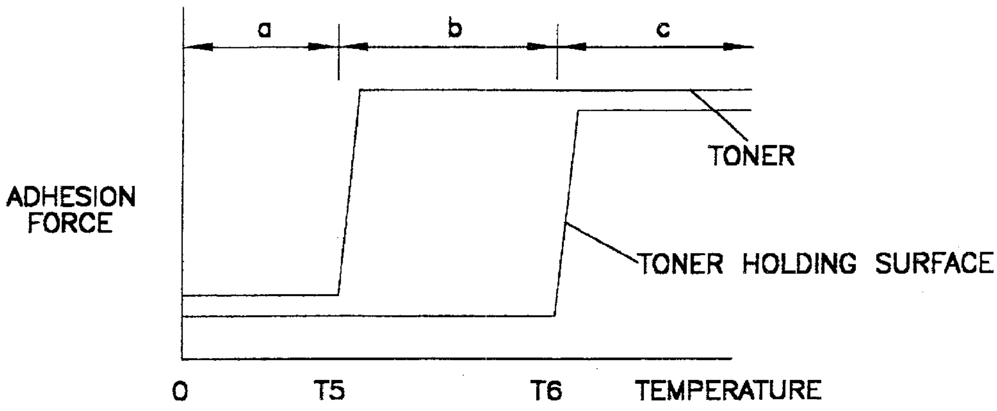
FIG. 9 is a graph illustrating as to how the third preferred embodiment according to the current invention operates on the thermally sensitive adhesion force of the toner and the image-forming surface.

Now referring to FIG. 9, a graph illustrates as to how the third preferred embodiment according to the current invention operates on the thermally sensitive adhesion force of the toner and the image-forming surface. Within a first temperature range a below a first predetermined temperature T5, a certain predetermined toner 1 and an image-forming surface 11 have a relatively low adhesion force. Within the first temperature range a, the toner 1 on the toner application roller 12 is uniformly transferred onto the image-forming surface 11. The uniformly applied toner on the image-forming surface 11 is moved towards the thermal unit 13 in a clockwise direction. The thermal unit 13 generates heat and transmits it to a limited area of the image-forming surface 11 according to a desired image to be generated on the image-carrying medium 6. The heat generation brings the temperature on the limited area of the image-forming surface 11 within a predetermined second temperature range b beyond the first predetermined temperature T5 but below a second temperature T6. Near the first predetermined temperature T5, the adhesion force of the toner substantially increases, and the increased toner adhesion force remains substantially high within the second temperature range b.

Within the second temperature range b, the adhesion force of the image-forming surface 11 remains substantially low. The heat generation further brings the temperature on the limited area of the image-forming surface 11 within a predetermined third temperature range c beyond the second predetermined temperature T6. Near the second predetermined temperature T6, the adhesion force of the image-forming surface 11 substantially increases, and the increased image-forming surface adhesion force remains substantially high within the third temperature range c. The second temperature T6 is higher than the first temperature T5. Within the third temperature range c, the adhesion force of the toner and the image forming surface 11 remain substantially high. Because of the difference in adhesion force of the toner on the image-forming surface and the image-forming surface within in the second temperature range b, the toner is released from the image-forming surface and is stuck onto the image-carrying medium.

Still referring to FIG. 9, in contrast to the second temperature range b where the toner transfer occurs, in other two temperature ranges a and c, the toner is not transferred onto the image-carrying medium. Within the first temperature range a, since the toner has a low adhesion force level, the toner does not leave the image-forming surface 11 even if the toner is in contact with the image-carrying medium 6. Within the third temperature range c, since the toner has a high adhesion force level when in contact with the toner application roller 12 which is heated by the heat source 14, the toner is viscous enough to stick on the toner application roller surface. After the toner is on the application roller 12, the toner is uniformly placed onto the image-formation surface 11 due to its high adhesion force as well as the highly viscous image-forming surface 11 as shown in the third temperature range c. After the toner on a given portion of the image-forming surface near the thermal unit 13 is selectively transferred onto the image-carrying medium 6 by decreasing the temperature of the image-forming surface 11 within the second temperature range b, the given image-forming surface portion 11 rotates away from the thermal control unit 13. As the image-forming portion 11 rotates back towards the toner application roller 12, the temperature of the image-forming portion 11 increases to the third temperature range c, and the image-forming portion 11 a new uniform layer of toner at locations where the toner had been selectively transferred. In summary, within the second temperature range b, an image is formed on the image-carrying medium while within the third temperature range c, toner is uniformly applied onto the image-forming surface 11. Preferably, the temperature difference to create a rapid adhesion force change is within 10° C. and more preferably within 5° C. Because of the relatively small temperature range, the third preferred embodiment is suitable for a fast and repetitive image formation processes.

As described in the preferred embodiments and alternative embodiments, toner is placed on to the image-forming surface and then is transferred onto the image-carrying medium based upon adhesion force, a sharp image is formed without suffering from the dispersion of toner during the transfer process. In addition, the adhesion force-based image forming device is simpler in construction and advantageously produces substantially no ozone. One preferred embodiment transfers toner to an image-carrying medium by increasing the adhesion force of the toner and almost simultaneously decreasing the adhesion force of the image-forming surface with the raised temperature.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of controlling relative adhesion force of predetermined developer and an image-forming surface with respect to a predetermined image-carrying medium, comprising the acts of:

adjusting a first adhesion force level of said predetermined developer;

adjusting a second adhesion force level of said image-forming surface;

placing said predetermined developer on said image-forming surface uniformly when said second adhesion force level is higher than said first adhesion force level; and transferring said predetermined developer on said image-forming surface onto said image-carrying medium according to a desired image when said first adhesion force level is higher than said second adhesion force level.

2. The method of controlling relative adhesion force of predetermined developer and an image-forming surface according to claim 1 wherein said first adhesion force level and said second adhesion force level are adjusted by changing temperature.

3. The method of controlling relative adhesion force of predetermined developer and an image-forming surface according to claim 2 wherein said first adhesion force level rapidly increases at a first temperature and said second adhesion force level rapidly decreases at a second temperature, said second temperature being higher than said first temperature.

4. The method of controlling relative adhesion force of predetermined developer and an image-forming surface according to claim 2 wherein said second adhesion force level rapidly decreases at a first temperature and said first adhesion force level rapidly increases at a second temperature, said second temperature being higher than said first temperature.

5. The method of controlling relative adhesion force of predetermined developer and an image-forming surface according to claim 1 wherein said predetermined developer is heat sensitive variable-viscous toner.

6. A method of controlling relative adhesion force of predetermined developer and an image-forming surface with respect to a predetermined image-carrying medium, comprising acts of:

adjusting a first adhesion force level of said predetermined developer;

adjusting a second adhesion force level of said image-forming surface;

placing said predetermined developer on said image-forming surface uniformly when said first adhesion force level and said second adhesion force level are both high; and transferring said predetermined developer on said image-forming surface onto said image-carrying medium according to a desired image when said first adhesion force level is substantially higher than said second adhesion force level.

7. The method of controlling relative adhesion force of predetermined developer and an image-forming surface according to claim 6 wherein said first adhesion force level and said second adhesion force level are adjusted by changing temperature.

8. The method of controlling relative adhesion force of predetermined developer and an image-forming surface according to claim 7 wherein said first adhesion force level rapidly increases at a first temperature and said second adhesion force level rapidly increases at a second temperature, said second temperature being higher than said first temperature.

9. A system for controlling relative adhesion force of predetermined developer and an image-forming surface with respect to a predetermined image-carrying medium, comprising:

a developer holding unit for holding said predetermined developer;

a first adhesion force adjustment unit located near said developer holding unit for adjusting a first adhesion force level of said predetermined developer;

a image-forming unit located near said developer holding unit having an image-forming surface and for selectively placing said toner on said image-forming surface;

a second adhesion force adjustment unit located near said image-forming unit for adjusting a second adhesion force level of said image-forming surface; and whereby said predetermined developer is uniformly placed on said image-forming surface when said second adhesion force level is higher than said first adhesion force level, said predetermined developer on said image-forming surface is transferred onto said image-carrying medium according to a desired image when said first adhesion force level is higher than said second adhesion force level.

10. The system for controlling relative adhesion force of predetermined developer and an image-forming surface according to claim 9 wherein said first adhesion force adjustment unit adjusts temperature of said predetermined developer so that said first adhesion force level changes, said second adhesion force adjustment unit adjusting temperature of said image-forming surface so that said second adhesion force level changes.

11. The system for controlling relative adhesion force of predetermined developer and an image-forming surface according to claim 10 wherein said first adhesion force level rapidly increases at a first temperature and said second adhesion force level rapidly decreases at a second temperature, said second temperature being higher than said first temperature.

12. The system for controlling relative adhesion force of predetermined developer and an image-forming surface according to claim 10 wherein said second adhesion force level rapidly decreases at a first temperature and said first adhesion force level rapidly increases at a second temperature, said second temperature being higher than said first temperature.

13. The system for controlling relative adhesion force of predetermined developer and an image-forming surface according to claim 9 wherein said predetermined developer is heat sensitive variable-viscous toner.

14. A system for controlling relative adhesion force of predetermined developer and an image-forming surface with respect to a predetermined image-carrying medium, comprising:

a developer holding unit for holding said predetermined developer;

a first adhesion force adjustment unit located near said developer holding unit for adjusting a first adhesion force level of said predetermined developer;

a image-forming unit located near said developer holding unit having an image-forming surface and for selectively placing said toner on said image-forming surface;

a second adhesion force adjustment unit located near said image-forming unit for adjusting a second adhesion force level of said image-forming surface; and whereby said predetermined developer is placed on said image-forming surface uniformly when said first adhesion force level and said second adhesion force level are both high, said predetermined developer on said image-forming surface is transferred onto said image-carrying medium according to a desired image when said first adhesion force level is higher than said second adhesion force level.

15. The system for controlling relative adhesion force of predetermined developer and an image-forming surface according to claim 14 wherein said first adhesion force adjustment unit adjusts temperature of said predetermined developer so that said first adhesion force level changes, said second adhesion force adjustment unit adjusting temperature of said image-forming surface so that said second adhesion force level changes.

16. The system for controlling relative adhesion force of predetermined developer and an image-forming surface according to claim 15 wherein said first adhesion force level rapidly increases at a first temperature and said second adhesion force level rapidly increases at a second temperature, said second temperature being higher than said first temperature.

* * * * *